United States Patent
Killilea et al.

(10) Patent No.: US 8,580,901 B2
(45) Date of Patent: *Nov. 12, 2013

(54) CROSSLINKABLE COATING COMPOSITIONS CONTAINING POLYURETHANE

(75) Inventors: T. Howard Killilea, North Oaks, MN (US); Robert W. Springate, Belvidere, IL (US)

(73) Assignee: Valspar Sourcing, Inc., Minneapolis, MN (US)

( * ) Notice: Subject to any disclaimer, the term of this patent is extended or adjusted under 35 U.S.C. 154(b) by 345 days.

This patent is subject to a terminal disclaimer.

(21) Appl. No.: 12/808,403

(22) PCT Filed: Dec. 18, 2008

(86) PCT No.: PCT/US2008/087495
§ 371 (c)(1),
(2), (4) Date: Mar. 24, 2011

(87) PCT Pub. No.: WO2009/079643
PCT Pub. Date: Jun. 25, 2009

(65) Prior Publication Data
US 2011/0172346 A1 Jul. 14, 2011

Related U.S. Application Data

(60) Provisional application No. 61/008,039, filed on Dec. 18, 2007.

(51) Int. Cl.
*C08G 18/10* (2006.01)

(52) U.S. Cl.
USPC ........... 525/455; 525/453; 525/454; 525/459; 524/589; 524/590; 524/591; 524/839; 524/840

(58) Field of Classification Search
USPC ................. 524/589, 590, 591, 839, 840, 507; 525/453, 454, 455, 459
See application file for complete search history.

(56) References Cited

U.S. PATENT DOCUMENTS

| | | |
|---|---|---|
| 4,133,786 A | 1/1979 | Harris et al. |
| 4,517,322 A | 5/1985 | Birkmeyer et al. |
| 5,534,310 A | 7/1996 | Rokowski et al. |
| 5,962,571 A | 10/1999 | Overbeek et al. |
| 6,610,784 B1 | 8/2003 | Overbeek et al. |
| 6,946,509 B2 | 9/2005 | He |
| 2008/0009601 A1 | 1/2008 | Killilea et al. |

FOREIGN PATENT DOCUMENTS

| | | |
|---|---|---|
| CN | 1882637 A | 12/2006 |
| WO | WO 02/28977 A2 | 4/2002 |
| WO | WO 02/28977 A3 | 6/2002 |
| WO | WO 2005/016999 | 2/2005 |

OTHER PUBLICATIONS

U.S. Appl. No. 61/008,039, filed Dec. 18, 2007, Killilea et al.
International Search Report and Written Opinion from related published PCT Application No. PCT/US2008/087495, dated Jun. 5, 2009; 9 pgs.
International Preliminary Report on Patentability from the related PCT Application No. PCT/US2008/087495, dated Jun. 22, 2010; 6 pgs.
"Standard Test Method for Acid and Base Number By Color-Indicator Titration," *ASTM D 974-04*, Ameican Society for Testing and Materials International of West Conshohocken, PA. [online]. [retrieved on Nov. 18, 2010]. Retrieved from the Internet<URL:http://astm.org/DATABASE.CART/HISTORICAL/D974-04.htm>; 3 pgs.
"Standard Practice for Assessing the Solvent Resistance of Organic Coatings Using Solvent Rubs," *ASTM D5402*, Ameican Society for Testing and Materials International of West Conshohocken, PA. [online]. [retrieved on Nov. 18, 2010]. Retrieved from the Internet:<URL:http://www.astm.org/Standards/D5402.htm>; 3 pgs.
Office Action from China Patent Office, issued on Feb. 22, 2012 for Patent Application No. 200880127401.6. 4 pgs. (English Translation, 4 pgs), Text of First Office Action (2 pgs).

*Primary Examiner* — Michael L Leonard
(74) *Attorney, Agent, or Firm* — Mueting Raasch & Gebhardt, P.A.

(57) ABSTRACT

An aqueous crosslinkable coating composition that includes a PU polymer and a vinyl polymer bearing carbonyl groups (i.e., a carbonyl-functional vinyl polymer) and/or latex polymer. The composition also preferably includes carbonyl-reactive amine and/or hydrazine functional groups.

20 Claims, No Drawings

CROSSLINKABLE COATING COMPOSITIONS CONTAINING POLYURETHANE

The present application is the §371 U.S. National Stage of International Application No. PCT/US2008/087495, filed Dec. 18, 2008, which claims priority to U.S. Provisional Patent Application Ser. No. 61/008,039, filed on Dec. 18, 2007, which are incorporated herein in their entireties.

BACKGROUND

Coating compositions including polyurethane (PU) polymers generally exhibit excellent resistance to abrasion, chemicals, and solvents. PU coatings may be used in various applications such as, for example, coatings for wood, concrete, metal, semi-rigid and flexible plastics, rubber, and leather, as well as in glass fiber sizing, printing inks, and adhesives.

PU coating compositions that exhibit suitable mechanical properties for such applications may be prepared using oil-modified PU polymers. Conventional oil-modified PU polymers are typically prepared in organic solvents and applied in clear or pigmented coatings. After application of a PU coating composition to a substrate, the organic solvent is evaporated to form a film that is then typically cured by air oxidation of ethylenic groups included in the PU polymers of the film.

Governments have increasingly established regulations restricting the release of volatile organic compounds (VOCs) into the atmosphere, which impact the use of PU coating compositions containing oil-modified PU polymers. To reduce the amount of released VOCs, manufacturers have been reducing the amount of organic solvent in PU coating compositions through use of water-dispersible PU polymers. Conventional water-dispersible PU polymers may be produced, for example, by reacting polyols and dihydroxy carboxylic acid compounds with an excess of diisocyanate to provide a carboxy-functional prepolymer having isocyanate (NCO) terminal groups. The acid groups may be neutralized to provide a neutralized prepolymer that is dispersible in water, which may be further modified to elicit various properties.

PU films formed using conventional water-dispersible PU polymers typically vary from films that are hard and relatively inflexible to films that are soft and highly flexible. It is often difficult to prepare a PU film that exhibits a proper blend of performance characteristics (e.g., both good hardness and flexibility) from conventional water-dispersible PU polymers. To achieve both good hardness and flexibility using conventional water-dispersible PU polymers, manufacturers typically formulate the PU polymers using increased amounts of isocyanate, which may result in increased material costs that are prohibitive for various applications.

As such, there is a continuing need for new aqueous-based low VOC or substantially VOC-free PU coating systems. There is also a need for such aqueous coating compositions that cure by crosslinking upon the evaporation of the water.

SUMMARY

The present invention provides an aqueous crosslinkable coating composition that includes a water-dispersible polyurethane (PU) polymer. In certain embodiments, the coating composition also includes a vinyl polymer bearing carbonyl groups (i.e., a carbonyl-functional vinyl polymer). In certain embodiments, the coating composition also includes a latex polymer. The composition may also include carbonyl-reactive amine and/or hydrazine functional groups. Although such functional groups can be incorporated in the vinyl polymer (or latex polymer), they are preferably in a crosslinker distinct from the vinyl polymer (or latex polymer) and the polyurethane polymer.

In one embodiment, the present invention provides an aqueous crosslinkable coating composition that includes: water; a water-dispersible polyurethane polymer; a carbonyl-functional vinyl polymer; and carbonyl-reactive amine and/or hydrazine functional groups. The water-dispersible polyurethane polymer includes: a plurality of urethane linkages; a plurality of cycloaliphatic groups having the structure X-Z-X, wherein: Z is an aliphatic ring structure; each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and wherein at least one of the X groups is a divalent linkage group that attaches the cycloaliphatic group to another portion of the polyurethane polymer; a plurality of salt or salt-forming groups; and a plurality of air-curable ethylenically unsaturated groups.

In certain embodiments, the carbonyl-functional vinyl polymer is a multi-stage vinyl latex polymer bearing carbonyl groups. In another embodiment, the multi-stage vinyl latex polymer includes at least one soft stage having a Tg of −65° C. to 50° C. and at least one hard stage having a Tg of 30° C. to 230° C.

In certain embodiments, the multi-stage vinyl latex polymer includes at least one stage having a high concentration of carbonyl functional monomer, preferably, the concentrated monomer feed contains 90% to 100% of the carbonyl-functional monomer used to make the completed vinyl polymer. For example, in a two-stage polymer the first 50% of the polymer is made with low levels of C=O and the second 50% contains high levels of C=O.

In certain embodiments, the carbonyl-reactive amine and/or hydrazine functional groups are incorporated within the vinyl polymer. In certain embodiments, the amine and/or hydrazine content of the vinyl polymer is 10 to 300 milliequivalents per 100 grams polymer.

In certain embodiments, the carbonyl-reactive amine and/or hydrazine functional groups are in a crosslinker distinct from the vinyl polymer and the polyurethane polymer. In certain embodiments, the crosslinker is a multi-functional amine (i.e., polyamine) comprising 2 to 10 primary amino groups per molecule. In certain embodiments, the crosslinker is a multi-functional hydrazine (i.e., polyhydrazine).

In certain embodiments, the level of crosslinker in the composition is that which provides at least 0.2 equivalent amine and/or hydrazine groups per mole of carbonyl functional groups present in the composition.

In certain embodiments, the weight ratio of the polyurethane polymer to the vinyl polymer bearing carbonyl functional groups in the composition is within a range of from 90:10 to 10:90.

In certain embodiments, the solids content is 20 percent by weight (wt-%) to 60 wt-%, based on the total weight of the composition. In certain embodiments, the composition includes less than 30 wt-% volatile organic compounds, based on the total weight of the composition.

In certain embodiments, the vinyl polymer bearing carbonyl functional groups is formed by free-radical addition polymerization of at least one carbonyl-containing monoethylenically unsaturated monomer with at least one other olefinically unsaturated monomer not providing carbonyl functionality.

In certain embodiments, the amount of carbonyl functional groups in the vinyl polymer is 3-500 milliequivalents per 100 grams polymer.

In certain embodiments, the polyurethane polymer includes at least 3 wt-% of cycloaliphatic-group-containing compound having the X-Z-X structure, based on the total dry weight of the polyurethane polymer.

In certain embodiments, the cycloaliphatic groups are located on a backbone of the polyurethane polymer.

In certain embodiments, the polyurethane polymer further comprises one or more additional linkage groups selected from a group consisting of ester groups, ether groups, urea groups, amide groups, carbonate groups, and combinations thereof.

In certain embodiments, Z comprises a closed six-member ring.

In certain embodiments, at least a portion of the air-curable ethylenically unsaturated groups are provided by a fatty acid.

The present invention also provides methods.

In one embodiment, there is provided a method of coating a substrate, the method comprising applying an aqueous crosslinkable coating composition as described herein, and removing the water (e.g., by evaporation). In one embodiment, there is provided a coated substrate preparable by this method.

In one embodiment, there is provided a method of preparing an aqueous crosslinkable coating composition, the method comprising: providing an aqueous dispersion comprising a water-dispersible polyurethane polymer, comprising: a plurality of urethane linkages; a plurality of cycloaliphatic groups having the structure X-Z-X, wherein: Z is an aliphatic ring structure; each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and wherein at least one of the X groups is a divalent linkage group that attaches the cycloaliphatic group to another portion of the polyurethane polymer; a plurality of salt or salt-forming groups; and a plurality of air-curable ethylenically unsaturated groups; and providing an aqueous dispersion of polymer particles comprising a carbonyl-functional vinyl polymer; providing carbonyl-reactive amine and/or hydrazine functional groups in a crosslinker distinct from either the polyurethane polymer or the carbonyl-functional vinyl polymer and/or incorporated within the carbonyl-functional vinyl polymer; combining the aqueous dispersion of the polyurethane polymer and the carbonyl-functional vinyl polymer to form a mixture; and if a distinct crosslinker is used, combining the mixture with the distinct crosslinker.

In certain embodiments, providing carbonyl-reactive amine and/or hydrazine functional groups comprises providing a crosslinker comprising the carbonyl-reactive amine and/or hydrazine functional groups, and combining the crosslinker with the mixture comprising the water-dispersible polyurethane polymer and the carbonyl-functional vinyl polymer.

In another embodiment, there is provided a method of preparing an aqueous crosslinkable coating composition, the method comprising: providing a carbonyl-functional vinyl polymer; preparing a water-dispersible polyurethane polymer in the presence of the carbonyl-functional vinyl polymer and combining the mixture with water, wherein the water-dispersible polyurethane comprises: a plurality of urethane linkages; a plurality of cycloaliphatic groups having the structure X-Z-X, wherein: Z is an aliphatic ring structure; each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and wherein at least one of the X groups is a divalent linkage group that attaches the cycloaliphatic group to another portion of the polyurethane polymer; a plurality of salt or salt-forming groups; and a plurality of air-curable ethylenically unsaturated groups; and providing carbonyl-reactive amine and/or hydrazine functional groups in a crosslinker distinct from either the polyurethane polymer or the carbonyl-functional vinyl polymer and/or incorporated within the carbonyl-functional vinyl polymer; and if a distinct crosslinker is used, combining the aqueous dispersion of the polyurethane polymer and the carbonyl-functional vinyl polymer with the distinct crosslinker.

In another embodiment, there is provided a method of preparing an aqueous crosslinkable coating composition, the method comprising: providing an aqueous dispersion of polymer particles comprising a carbonyl-functional vinyl polymer; preparing a water-dispersible polyurethane prepolymer; combining the water-dispersible polyurethane prepolymer with the aqueous dispersion of polymer particles comprising a carbonyl-functional vinyl polymer; and forming a water-dispersible polyurethane polymer from the polyurethane prepolymer in the presence of the polymer particles comprising a carbonyl-functional vinyl polymer, and providing carbonyl-reactive amine and/or hydrazine functional groups in a crosslinker distinct from either the polyurethane polymer or the carbonyl-functional vinyl polymer and/or incorporated within the carbonyl-functional vinyl polymer; and if a distinct crosslinker is used, combining the aqueous dispersion of the polyurethane polymer and the carbonyl-functional vinyl polymer with the distinct crosslinker. The water-dispersible polyurethane comprises: a plurality of urethane linkages; a plurality of cycloaliphatic groups having the structure X-Z-X, wherein: Z is an aliphatic ring structure; each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and wherein at least one of the X groups is a divalent linkage group that attaches the cycloaliphatic group to another portion of the polyurethane polymer; a plurality of salt or salt-forming groups; and a plurality of air-curable ethylenically unsaturated groups.

In another embodiment, there is provided a method of preparing an aqueous crosslinkable coating composition, the method comprising:

providing a latex polymer; preparing a water-dispersible polyurethane prepolymer; combining the latex polymer and the polyurethane prepolymer (e.g., with isocyanate end groups); and forming a water-dispersible polyurethane polymer from the polyurethane prepolymer (e.g., by chain extending the prepolymer) in the presence of the latex polymer, wherein the water-dispersible polyurethane comprises: a plurality of urethane linkages; a plurality of cycloaliphatic groups having the structure X-Z-X, wherein: Z is an aliphatic ring structure; each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and wherein at least one of the X groups is a divalent linkage group that attaches the cycloaliphatic group to another portion of the polyurethane polymer; a plurality of salt or salt-forming groups; and a plurality of air-curable ethylenically unsaturated groups.

The present invention also provides aqueous crosslinkable coating compositions preparable by any of the methods described herein.

The present invention also provides an aqueous crosslinkable coating composition comprising: a latex polymer; and a water-dispersible polyurethane polymer, comprising: a plurality of urethane linkages; a plurality of cycloaliphatic groups having the structure X-Z-X, wherein: Z is an aliphatic ring structure; each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and wherein at least one of the X groups is a divalent linkage group that attaches the cycloaliphatic group to another portion of the polyurethane polymer; a plurality of salt or salt-forming groups; and a plurality of air-curable ethylenically unsaturated groups.

Definitions

Unless otherwise specified, the following terms used in this specification have the meanings provided below.

The term "carbonyl-functional" refers to carbonyl functionality of a ketone or aldehyde group (C=O). Such carbonyl functional groups in a vinyl polymer (or latex polymer) are normally chain-pendant and/or terminal groups.

The term "cycloaliphatic" refers to an organic compound or group containing a saturated or unsaturated non-aromatic closed ring structure.

The term "dry weight" as used herein in the context of a prepolymer or polymer refers to the total weight of the reactants (not including any solvents) for forming the PU prepolymer or polymer.

The term "isocyanate" refers to organic compounds having at least one isocyanate, or —NCO, group. Unless indicated otherwise, the term includes both isocyanates and polyisocyanates (e.g., diisocyanates, triisocyanates, etc.).

The term "prepolymer" refers to an intermediate polymer stage formed during production of a PU polymer. An exemplary prepolymer can have isocyanate end groups that are subsequently reacted by chain extension to form a polymer.

An aqueous dispersion of polymer particles encompasses the meaning of latex polymer and water dispersible polymer.

A "latex" polymer means an aqueous dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

The term "water-dispersible" used in the context of a prepolymer (or polymer) means that (1) the prepolymer (or polymer) is itself capable of being dispersed into an aqueous carrier such as, for example, water (e.g., without requiring the use of a separate surfactant) or a latex polymer or (2) an aqueous carrier can be added to the polymer (or prepolymer) to form a stable dispersion (i.e., the dispersion should have at least one-month shelf stability at normal storage temperatures). Such water-dispersible polymers can include nonionic or anionic functionality on the polymer (or prepolymer), which assist in rendering them water-dispersible. For such polymers (or prepolymers), external acids or bases are typically required for anionic stabilization; however, these are not considered secondary emulsifying agents (e.g., surfactants).

The term "multi-stage" when used with respect to a latex means the latex polymer was made using discrete charges of one or more monomers or was made using a continuously-varied charge of two or more monomers. Usually a multi-stage latex will not exhibit a single Tg inflection point as measured using DSC. For example, a DSC curve for a multi-stage latex made using discrete charges of one or more monomers may exhibit two or more Tg inflection points. Also, a DSC curve for a multi-stage latex made using a continuously-varied charge of two or more monomers may exhibit no Tg inflection points. By way of further explanation, a DSC curve for a single-stage latex made using a single monomer charge or a non-varying charge of two monomers may exhibit only a single Tg inflection point. Occasionally when only one Tg inflection point is observed, it may be difficult to determine whether the latex represents a multi-stage latex. In such cases a lower Tg inflection point may sometimes be detected on closer inspection, or the synthetic scheme used to make the latex may be examined to determine whether or not a multi-stage latex would be expected to be produced.

A group that may be the same or different is referred to as being "independently" something. Substitution is anticipated on the organic groups of the compounds of the present invention. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, for example, "alkyl group" includes ether groups, haloalkyls, nitroalkyls, carboxyalkyls, hydroxyalkyls, sulfoalkyls, etc.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably.

As used herein, the term "or" is generally employed in its sense including "and/or" unless the content clearly dictates otherwise.

The term "and/or" means one or all of the listed elements or a combination of any two or more of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "room temperature" refers to a temperature of 20° C. to 25° C. or preferably 22° C. to 25° C.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

The present invention provides an aqueous coating composition that includes a polyurethane (PU) polymer. In certain embodiments, the coating composition also includes a vinyl polymer bearing carbonyl groups (i.e., a carbonyl-functional vinyl polymer). In certain embodiments, the coating composition also includes a latex polymer. The composition may also include carbonyl-reactive amine and/or hydrazine functional groups. Although such functional groups can be incorporated in the vinyl polymer (or latex polymer), they are preferably in a crosslinker distinct from the vinyl polymer (or the latex polymer) and the polyurethane polymer. The carbonyl groups can not only react with amine groups on the polyurethane polymer, but also with the amine and/or hydrazine groups, whether they are a part of the vinyl polymer (or latex polymer) or in a separate molecule, to crosslink the composition. Such crosslinking reactions are reversible as long as water is present in the composition. Upon coating, the water is driven off through evaporation, which drives the equilibrium toward the crosslinking reaction.

Water-Dispersible Polyurethane Polymers

Preferred water-dispersible PU polymers for use in a coating composition of the present invention include urethane linkages, cycloaliphatic groups, air-curable ethylenically unsaturated groups, and salt groups. If desired, the PU polymer may be formed via a water-dispersible PU prepolymer intermediate that may be optionally combined with an aqueous carrier (which can include a latex polymer) to form a dispersion useful in coating applications. The dispersed PU prepolymer may then be optionally chain-extended (or otherwise modified or processed) (optionally in the presence of a latex polymer) to form a PU polymer useful in coating compositions.

The PU polymer of the present invention may be included in PU dispersions (or coating compositions) for use in a variety of coating applications such as, for example, coatings for wood, concrete, metal, semi-rigid and flexible plastics, rubber, leather, glass fiber sizing, printing inks, and adhesives. Due to its water-dispersibility, the PU polymer of the present invention may be useful in coating applications requiring low or substantially zero VOC levels. Some embodiments of the PU polymer are particularly suited for one-component applications in wood flooring where excellent toughness, chemical and water resistance, and rapid dry times may be required.

As discussed above, to achieve both good hardness and flexibility using conventional water-dispersible PU polymers, manufacturers typically formulate the PU polymers using increased amounts of isocyanate. In some embodiments, PU films prepared using the water-dispersible PU polymer of the present invention exhibit both suitable hardness and flexibility without requiring the use of increased isocyanate levels, which may result in enhanced cost efficiency. In addition, PU films prepared using the water-dispersible PU polymer of the present invention may exhibit enhanced physical properties relative to PU films prepared using conventional water-dispersible PU polymers. While not wishing to be bound by theory, the cycloaliphatic groups of the PU polymer may enhance the physical properties of PU films through mobility of the ring structure, especially when the cycloaliphatic groups are located in a backbone of the PU polymer.

As discussed above, the PU polymer of the present invention may be formed via a PU prepolymer (which, for example, can include isocynate end groups that can be subsequently chain extended). Any suitable cycloaliphatic group may be included in the PU prepolymer. Examples of suitable cycloaliphatic groups for incorporation in the PU prepolymer (and ultimately the PU polymer) include groups having the structure X-Z-X, wherein Z is an aliphatic ring structure and each X is a group independently selected from ester groups, ether groups, amide groups, carbonate groups, hydrogen, or $CR_n$, where n is 0, 1 or 2, and R is independently selected from hydrogen, a halogen, oxygen, nitrogen, an organic group, and combinations thereof (i.e., when n=2, the two R's may be the same or different). One or both of the X groups preferably are linkage groups that attach the cycloaliphatic groups to other portions of the PU polymer.

Preferably, the cycloaliphatic groups having the X-Z-X structure are incorporated into a backbone of the PU polymer such that each cycloaliphatic group is attached to the backbone through one or both of the X groups, thereby forming a segment of the backbone. In such embodiments, the cycloaliphatic groups may be segments located at a terminal end of the backbone, intermediate segments located at an intermediate location of the backbone, or combinations thereof. In some embodiments, Z is a divalent cycloaliphatic ring structure and each X is a linkage group that attaches Z (and thus the cycloaliphatic group) to other portions of the PU polymer. In some embodiments (e.g., where one of the X groups is hydrogen), the X-Z-X structure may be located at a terminal end of the PU polymer backbone.

Z may be any type and/or size of suitable closed aliphatic ring structure. For example, Z may be a 3-member organic ring, a 4-member organic ring, a 5-member organic ring, a 6-member organic ring, or any other organic non-aromatic aliphatic ring structure having 7 or more ring members. As used herein the term "n-member ring" (and variants thereof), where n is an integer, refers to the number n of atoms making up the ring. In presently preferred embodiments, Z is a closed six-member organic ring structure. Examples of preferred six-member organic ring structures for Z include cyclohexane groups, cyclohexene groups, cyclohexadiene groups, and variants thereof. In a preferred embodiment, Z is a cyclohexane group having the X groups covalently attached at the 1,2; 1,3; or 1,4 positions of the hexane ring.

Cycloaliphatic groups may be incorporated into the PU prepolymer, and ultimately the PU polymer, via any cycloaliphatic-group-containing compound (or combination of compounds). As used herein, the term "cycloaliphatic-group-containing compound" refers to compounds including one or more cycloaliphatic groups of the above X-Z-X structure, compounds including one or more cycloaliphatic groups of structures other than the X-Z-X structure, and compounds including both one or more cycloaliphatic groups of the X-Z-X structure and one or more cycloaliphatic groups of structures other than the X-Z-X structure. As used herein, when cycloaliphatic-group-containing compounds used to make the PU polymer are referred to as containing (or having, including, etc.) the X-Z-X structure, this refers to compounds that include (1) the entire X-Z-X structure or (2) the Z group and either (i) at least a portion of the X groups or (ii) a precursor group used to form at least a portion of the X groups, or (iii) a combination of (i) and (ii). Examples of cycloaliphatic-group-containing compounds include cycloaliphatic polyols, cycloaliphatic polycarboxylic acids, cycloaliphatic polyesters, cyclo aliphatic polyamides, cycloaliphatic alkyd compounds, and combinations thereof. Preferably, at least a substantial portion (and in some embodiments all) of the cycloaliphatic groups are provided through compounds including the X-Z-X structure. In some embodiments, some or all of the cycloaliphatic groups may be incorporated into the PU polymer via cycloaliphatic alkyds and/or cycloaliphatic polyesters formed from reactants including cycloaliphatic polycarboxylic acids and cycloaliphatic polyols. In a preferred embodiment, the cycloaliphatic group is formed from a 1,4-cyclohexane diacid and/or a compound containing a 1,4-cyclohexane diacid.

The PU polymer may include one or more cycloaliphatic groups incorporated into the PU polymer through an isocyanate compound containing a cycloaliphatic group. In such embodiments, the PU polymer preferably contains cycloaliphatic groups incorporated through both cycloaliphatic isocyanate and non-isocyanate compounds (e.g., compounds having the above X-Z-X structure).

The amount of cycloaliphatic groups in the PU polymer may vary depending on the desired film or coating properties. Preferably, the amount of cycloaliphatic groups in the PU polymer is optimized so that films formed from coating compositions containing the PU polymer exhibit both suitable levels of flexibility and hardness for the desired coating applications. As discussed above, preferably at least a substantial portion (and in some embodiments all) of the cycloaliphatic-group-content of the PU polymer is provided by compounds containing the X-Z-X structure. In some embodiments, the PU polymer includes at least 3, preferably at least 4, and more preferably at least 5, weight percent (wt-%) of cycloaliphatic-group-containing compound(s) having the X-Z-X structure, based on the dry weight of the PU polymer. In some embodiments, the PU polymer includes less than 20, preferably less than 16, and more preferably less than 12 weight percent of cycloaliphatic-group-containing compound(s) containing the X-Z-X structure, based on the dry weight of the PU polymer.

A variety of isocyanates may be used to form the PU polymers and the urethane linkages contained therein. The isocyanates may suitably be aliphatic, cycloaliphatic, araliphatic or aromatic isocyanates, diisocyanates, triisocyanates, or other polyisocyanates. Examples of suitable diisocyanates include 1,2-ethylene diisocyanate, 1,4-tetramethylene diisocyanate, 1,6-hexamethylene diisocyanate, 2,2,4-trimethyl-1,6-hexmethylene diisocyanate, 2,4,4-trimethyl-1, 6-hexmethylene diisocyanate, 1,12-dodecane diisocyanate, cyclobutane 1,3-diisocyanate, cyclohexane 1,3-diisocyanate, cyclohexane-1,4-diisocyanate, bis(4-isocyanatocyclohexyl)methane (Des W), 1-methylcyclohexane-2,2-diisocyanate, 1-methylcyclohexane-2,6-diisocyanate, 3-isocyanatomethyl-3,5,5-trimethyl-cyclohexyl isocyanate (isophorone diisocyanate, IPDI), 2,5-bis(isocyanatomethyl)-8-methyl-1, 4,-methano-decahydronaphthalene, 3,5-bis(isocyanatomethyl)-8-methyl-1,4,-methano-decahydronaphthalene, 2,6-bis-(isocyanato)-4,7-methano-hexahydroindane, dicyclohexyl 2,4'-diisocyanate, dicyclohexyl 4,4'-diisocyanate, 2,6-hexahydrotolylene diisocyanate, 2,6-hexahydrotolylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 4,4'-biphenyl diisocyanate, 4,4'-diisocyanato-3,3'-dimethoxybiphenyl, 4,4'-diisocyanato-3,3'-dimethylbiphenyl, 3,3'-dipenylbiphenyl-4,4'-diisocyanate, 2,4'-diphenylmethane diisocyanate, 4,4'-diphenylmethane diisocyanate (MDI), naphthylene 1,5-diisocyanate, toluene diisocyanates (TDI), such as, for example, 2,4-toluene diisocyanate, 2,6-toluene diisocyanate, N,N'-(4,4'-dimethyl-3,3'-diisocyanato-diphenyl)uretdione, m-xylylene diisocyanate, tetramethylxylylene diisocyanate, and the like; or triisocyanates, such as, for example, 2,4,4'-triisocyanatodiphenyl ether, 4,4',4"-triisocyanatotriphenylmethane, tris (4-isocyanatophenyl) thiophosphate, and the like; polyisocyanates (isocyanurates) based on 1,6-hexamethylene diisocyanate such as, for example, 1,3,5-tris-(6-isocyanato-hexyl)[1,3,5] triazinane-2,4,6-trione (Desmodur N-3300) and 1,3-bis-(6-isocyanato-hexyl)-1-[(6-isocyanato-hexylamino)-oxomethyl]-urea (Desmodur N-75); or mixtures thereof. More preferred isocyanates include toluene diisocyanates such as, for example, 2,4-toluene diisocyanate, and 2,6-toluene diisocyanate, 1,6-hexamethylene diisocyanate, 2,4'-disocyanato-diphenylmethane, 4,4'-disocyanato-diphenylmethane, 4,4'-diphenylmethane diisocyanate (MDI), 3-isocyanato-methyl-3,5,5-trimethyl-cyclohexyl isocyanate (IPDI), bis(4-isocyanatocyclo-hexyl)methane (Des W), dicyclohexyl 2,4'-diisocyanate, dicyclohexyl 4,4'-diisocyanate; or mixtures thereof. Most preferred isocyanates are 2,4-toluene diisocyanate, and 2,6-toluene diisocyanate, 1,6-hexamethylene diisocyanate, 2,4'-disocyanato-diphenylmethane, 4,4'-diso-cyanato-diphenylmethane, 4,4'-diphenylmethane diisocyanate (MDI), 3-isocyanatomethyl-3,5,5-trimethyl-cyclohexyl isocyanate (IPDI), bis(4-isocyanatocyclohexyl)methane (Des W), or mixtures thereof.

In some embodiments, the PU polymer includes preferably less than 55, more preferably less than 50, and even more preferably less than 45 weight percent (wt-%) polyisocyanate, based on the dry weight of the PU polymer. In some embodiments, the PU polymer preferably includes at least 15, more preferably at least 25, and even more preferably at least 30 weight percent polyisocyanate, based on the dry weight of the PU polymer.

In addition to urethane linkages, the PU prepolymer and/or polymer may contain any other suitable linkage group (e.g., ester groups, ether groups, urea groups, amide groups, carbonate groups, and combinations thereof).

Preferably at least one of the reactants for forming the PU polymer includes one or more air-curable ethylenically unsaturated groups to facilitate air-induced curing of coating compositions including the PU polymer. Such ethylenic unsaturation may be introduced into the PU polymer, for example, through incorporation of an ester polyol, a hydroxy-functional oil or fatty acid containing autooxidative carbon-carbon double bonds, alkyd-based polyols, or any other suitable reactant. Preferably, the air-curable ethylenically unsaturated groups are provided by a fatty acid. The degree of saturation or unsaturation of the PU polymer may be tailored to facilitate crosslinking of coating compositions for various applications.

The PU polymer preferably contains at least 5, more preferably at least 15, and most preferably at least 25 weight percent of ethylenically-unsaturated compound, based on the dry weight of the PU polymer. In some of these embodiments, the reaction mixture may contain less than 65, preferably less than 55, and more preferably less than 50, weight percent of ethylenically-unsaturated compound, based on the dry weight of the PU polymer.

In some embodiments, the PU polymer preferably contains at least 20, more preferably at least 30, and even more preferably at least 35, weight percent of alkyd-based polyol, based on the dry weight of the PU polymer. In some of these embodiments, the reaction mixture preferably contains less than 65, more preferably less than 55, and even more preferably less than 50, weight percent of alkyd-based polyol, based on the dry weight of the PU polymer. Some or all of the alkyd-based polyol may optionally include the X-Z-X structure described above.

Alkyd-based polyols (or hydroxy-functional alkyds) can be prepared using any suitable method, and may or may not contain sulfonate functionality. Processes for producing alkyds from conventional oils are known in the art. See, for example, U.S. Pat. Nos. 4,133,786, 4,517,322, and 6,946, 509. An example of a method to prepare an alkyd could include the alcoholysis of an oil and polyol with a further reaction with polybasic acids and, optionally, further polyols. In addition, polybasic acids and fatty acids may be reacted with polyols in suitable proportions to prepare the alkyds. In a preferred embodiment, ethylenically unsaturated groups are incorporated into the PU polymer through a cycloaliphatic-based alkyd polyol compound containing at least one ethylenically unsaturated group. Monoglycerides and diglycerides may also be utilized in place of, or in addition to, the hydroxy functional alkyd. Suitable monoglycerides and diglycerides can be readily synthesized using conventional techniques. Polyols synthesized via the reaction of at least one fatty acid and a polyol may also be employed to provide ethylenic unsaturation.

Examples of suitable oils and/or fatty acids derived therefrom useful in producing alkyds include compounds such as, for example, linseed oil, safflower oil, tall oil, cotton seed oil, ground nut oil, tung oil, wood oil, ricinene oil, sunflower oil, soya oil, castor oil, dehydrated castor oil, and the like. Examples of suitable fatty acids include soya fatty acids, linseed fatty acids, dehydrated castor fatty acids, linolenic fatty acids, ricinoleic fatty acids, and linoleic fatty acids. These oils or fatty acids can be used alone or as a mixture of one or more of the oils or fatty acids.

Examples of suitable polyols for use in forming alkyds include difunctional alcohols, trifunctional alcohols (e.g., glycerine, trimethylol propane, trimethylol ethane, trimethylol butane, tris hydroxyethyl isocyanurate, etc.), tetrahydric or higher alcohols (e.g., pentaerythritol, diglycerol, etc.), and combinations thereof. Examples of suitable diols include neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, and combinations thereof. Preferably employed polyols include glycerol, trimethylolpropane, neopentyl glycol, diethylene glycol, pentaerythritol, and combinations thereof.

The reaction mixture of the present invention preferably includes one or more aliphatic, cycloaliphatic, or aromatic polycarboxylic acids. As used herein, the term "polycarboxylic acid" includes both polycarboxylic acids and anhydrides thereof. Examples of suitable polycarboxylic acids include compounds such as, for example, aliphatic, cycloaliphatic saturated or unsaturated and/or aromatic polybasic carboxylic acids, such as, for example, dicarboxylic, tricarboxylic and tetracarboxylic acids. Specific examples of suitable polycarboxylic acids include phthalic acid, isophthalic acid, adipic grid, terephthalic acid, tetrahydrophthalic acid, naphthalene dicarboxylic acid, hexahydrophthalic acid, endomethylenetetrahydrophthalic acid, succinic acid, glutaric acid, sebacic acid, azelaic acid, trimellitic acid, pyromellitic acid, fumaric acid, maleic acid, 1,4-cyclohexane diacid, hydrogenated phthalic anhydride, and anhydrides and combinations thereof.

In some embodiments, polyols such as polyether polyols, polyester polyols, polyurea polyols, polyamide polyols, polycarbonate polyols, and combinations thereof may be included in the PU polymer. In some embodiments, these compounds may include as constituents the polyols and/or polycarboxylic acids described above in regards to alkyd formation.

The PU prepolymer and/or polymer preferably contain a suitable amount of salt-containing and/or salt-forming groups to facilitate preparation of a PU dispersion with an aqueous carrier.

Examples of suitable salt-forming groups include neutralizable groups (e.g., acidic or basic groups). At least a portion of the salt-forming groups may be neutralized to form salt groups useful for dispersing the PU prepolymer into an aqueous carrier. Acidic or basic salt-forming groups may be introduced into the PU prepolymer by any suitable method. One or more compounds containing an active hydrogen group and active acid or base group may be included as reactants for forming the PU prepolymer. Examples of suitable compounds having active hydrogen and acid groups include hydroxy and mercapto carboxylic acids, aminocarboxylic acids, aminohydroxy carboxylic acids, sulfonic acids, hydroxy sulfonic acids, aminosulfonic acids, and combinations thereof. Examples of suitable compounds having active hydrogen and basic groups include aliphatic, cycloaliphatic and heterocyclic amino alcohols, diols and triols, amines, diamines, triamines, tetramines, amides, and combinations thereof.

For example, PU polymers can be made water-dispersible by incorporating amine or acid functionality into the PU polymers. For example, water-based anionically stabilized PU polymers can be prepared by reacting polyols and dihydroxy carboxylic acid compounds (e.g., dimethylol propionic acid and/or dimethylol butanoic acid) with an excess of diisocyanate to provide a carboxylic acid functional prepolymer having NCO terminal groups. The acid groups can be neutralized with tertiary amines to provide salt groups. The resulting neutralized prepolymer can be readily dispersed in water. Alternatively, the anionic stabilizing group of the water-dispersible PU prepolymers can be replaced with cationic stabilizing groups or non-ionic stabilizing groups, to facilitate water dispersibility.

Any acid or base may be used to neutralize the acidic or basic salt-forming groups and form salt groups. Examples of suitable neutralizing bases include inorganic bases such as sodium hydroxide, potassium hydroxide, lithium hydroxide, ammonia, triethylamine, dimethyl ethanol amine, and combinations thereof. Examples of suitable neutralizing acids include organic acids such as formic acid and acetic acid, inorganic acids such as hydrochloric acid and sulfuric acid, and combinations thereof.

In some embodiments, inclusion of a salt-containing group may enable the PU prepolymer to be suitably dispersed in an aqueous carrier without requiring a neutralization step. Examples of suitable salt-containing groups include sulfonate groups present in the form of alkali metal salts (e.g., lithium, sodium, potassium, etc.); sulfonate groups present in the form of ammonium, tertiary amine, copper, or iron salts; and combinations thereof. Examples of preferred monomers having sulfonate groups that may be incorporated into the PU prepolymer include, 5-(sodiosulfo)isophthalic acid (SSIPA), 5-(lithiosulfo)isophthalic acid (LSIPA), and the like. Non-sulfonate salt-containing groups may also be employed in addition to, or in place of, sulfonate groups.

The water-dispersible PU prepolymer may be formed using techniques and equipment that will be familiar to persons skilled in the art. The PU prepolymer may be dispersed into an aqueous carrier and chain extended (or otherwise modified) to obtain higher molecular weight PU polymers. Extension of the PU prepolymer may be achieved by reaction of the neutralized water-dispersed PU prepolymer with a chain extender. This may occur, for example, by reacting one or more chain extenders with terminal or pendant isocyanate(s) present on the PU prepolymer. Examples of suitable chain extenders include alkyl amino alcohols, cycloalkyl amino alcohols, heterocyclic amino alcohols, polyamines (e.g., ethylene diamine, diethylene triamine, triethylene tetraamine, melamine, etc.), hydrazine, substituted hydrazine, hydrazide, amides, water, other suitable compounds having active hydrogen groups, and combinations thereof.

The molecular weight of PU polymers of the present invention may vary widely and may be tailored for particular applications. In some embodiments, the PU polymers preferably have peak molecular weights ($M_p$) of at least 3,000 Daltons, more preferably at least 5,000 Daltons, and even more preferably at least 10,000 Daltons. In some embodiments, the PU polymers preferably have $M_p$ of less than 150,000 Daltons, more preferably less than 120,000 Daltons, and even more preferably less than 100,000 Daltons. $M_p$ of a PU polymer, as defined herein, is the peak value obtained from a molecular weight distribution plot, which has weight fraction on ordinate (Y-axis) and specific molecular weight on abscissa (X-axis). Weight fraction is defined as a ratio of PU polymer of a specific molecular weight in a PU polymer sample to the total weight of the sample. For further discussion of $M_p$ and methods for determining $M_p$, see U.S. Pat. No. 5,534,310 (Rokowski et al.).

In some embodiments, the PU polymers preferably have number average molecular weights ($M_n$) of at least 1,000 Daltons, more preferably at least 1,500 Daltons, and even more preferably at least 2,000 Daltons. In some embodiments, the PU polymers preferably have $M_n$ of less than 150,000 Daltons, more preferably less than 120,000 Daltons, and even more preferably less than 100,000 Daltons.

The ratio of cycloaliphatic groups included in the PU polymer relative to the isocyanate units (or urethane linkages) included in the PU polymer may vary to produce the desired result. The PU polymer preferably includes less than 8, more preferably less than 7, and most preferably less than 6, isocyanate units per 1 cycloaliphatic group having the X-Z-X structure. Moreover, the PU polymer preferably includes at least 1, more preferably at least 2, and even more preferably at least 3, isocyanate units per 1 cycloaliphatic group having the X-Z-X structure described above.

PU polymers for use in a coating composition of the present invention may exhibit any suitable acid number. Acid numbers are typically expressed as milligrams of KOH required to titrate a sample to a specified end point. Methods for determining acid numbers are well known in the art. See, for example, ASTM D 974-04 entitled "Standard Test Method for Acid and Base Number by Color-Indicator Titration" and available from the American Society for Testing and Materials International of West Conshohocken, Pa. In some embodiments, the PU polymer may have an acid number of at least 2, and more preferably at least 5. In some embodiments, the PU polymer may have an acid number of less than 40, and more preferably less than 30.

A suitable polyurethane dispersion of the present invention can be made as follows: in a reactor is combined 32 to 50 parts of isocyanate; 35 to 55 parts of alkyd polyol containing the X-Z-X structure, and 4 to 12 parts of aliphatic dicarboxylic acid. The choice of which isocyanate, alkyd polyol, and dicarboxylic acid to use and in what specific amount may be determined based on the desired end use. If desired, 0 to 30 parts other additives may be introduced. The reactants are typically reacted under a nitrogen blanket in the presence of a suitable amount of n-methylpyrollidone. The mixture is typically heated to 80° C. whereupon 200 ppm dibutyl tin dilaurate is added and the reaction is processed until the isocyanate level of the mixture is below 5% as determined by titration with hydrochloric acid. The resulting PU prepolymer is then typically cooled to 65° C. and a suitable amount of triethylamine is added to form salts groups on the PU prepolymer. The PU prepolymer is then typically dispersed into 50° C. deionized water and is subsequently chain extended using 2 to 6 parts of polyamine chain extender. Manganese drier (35 ppm) is then typically added and the dispersion is reduced to 33% solids by weight with water.

Alkyd Polyol Preparation: an alkyd polyol can be formed from 10-25 parts cycloaliphatic-containing compound of the X-Z-X structure, 40-70 parts fatty acids or oil, and 10-40 parts dicarboxylic acid and/or polyol. The choice of which cycloaliphatic-containing compound of the X-Z-X structure, which fatty acids or oil, and which dicarboxylic acid and/or polyol to use, and in what specific amount may be determined based on the desired end use. The reaction mixture is typically slowly heated to 230° C. and stirred as water is removed. The mixture is typically heated and tested until a test sample has an acid number of less than 2 mg of KOH/gram. Once the acid number is less than 10 mg of KOH/gram, a suitable amount xylene is added and the mixture processed under reflux. The xylene is stripped to less than 1%.

Thus, as described above, the present invention provides a composition that includes a water-dispersible PU polymer that includes at least one cycloaliphatic group of the X-Z-X structure located preferably in a backbone of the PU polymer. Relative to films formed using conventional water-dispersible PU polymers, films formed using water-dispersible PU polymers may (1) exhibit comparable or enhanced properties such as hardness and flexibility and/or (2) utilize reduced amounts of isocyanate.

Carbonyl-Functional Vinyl Polymers and Latex Polymers

The vinyl polymer bearing carbonyl-functional groups may be formed by free-radical addition polymerization of at least one carbonyl-containing monoethylenically unsaturated monomer with at least one other olefinically unsaturated monomer not providing carbonyl functionality.

Examples of monoethylenically unsaturated monomers which bear carbonyl-functional groups include acrolein, methacrolein, diacetone-acrylamide, crotonaldehyde, 4-vinylbenzaldehyde, vinyl alkyl ketones of 4 to 7 carbon atoms such as vinyl methyl ketone, and acryloxy- and methacryloxy-alkyl propanols. Further examples include acrylamidopivalaldehyde, methacrylamidopivalaldehyde, 3-acrylamidomethylanisaldehyde, diacetone acrylate, and diacetone methacrylate.

The amount of carbonyl functional groups (C=O) in the vinyl polymer is preferably at least 3, and more preferably at least 6, milliequivalents (meq) per 100 grams (g) polymer. The amount of carbonyl functional groups in the vinyl polymer is preferably no more than 500 meq per 100 g polymer, even more preferably no more than 400 meq per 100 g polymer, even more preferably no more than 200 meq per 100 g polymer, and most preferably no more than 100 meq per 100 g polymer.

Examples of non-carbonyl-providing olefinically unsaturated monomers useful in preparing carbonyl-functional polymers, as well as latex polymers which do not contain carbonyl functionality, include 1,3-butadiene, isoprene, styrene, divinyl benzene, acrylonitrile, methacrylonitrile, vinyl halides (such as vinyl chloride), vinyl esters (such as vinyl acetate, vinyl propionate and vinyl laurate), hetero cyclic vinyl compounds, alkyl esters of monolefinically unsaturated dicarboxylic acids (such as di-n-butyl maleate and di-n-butyl fumarate) and, in particular, esters of acrylic acid and methacrylic acid, examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, hydroxyethyl methacrylate, hydroxypropyl methacrylate, isopropyl methacrylate, n-propyl acrylate, and n-propyl methacrylate.

Olefinically unsaturated monomers bearing anionic water-dispersing groups may also be used, examples of which include acrylic acid, methacrylic acid, itaconic acid and/or maleic acid.

Olefinically unsaturated monomers having non-ionic groups, such as alkoxy polyethylene glycol methacrylates, may also be used.

The vinyl polymer may optionally bear, in addition to the carbonyl functional groups, amine and/or hydrazine functional groups as mentioned above (although this is not preferred). Hydrazine functional groups may preferably be introduced by polymerizing into the vinyl polymer at least one olefinically unsaturated monomer with (chain-pendant) hydrazinolysable groups which are subsequently reacted with a hydrazine yielding agent to convert at least a proportion of the hydrazinolysable groups into hydrazine functional groups.

Examples of monomers providing chain-pendant hydrazinolysable groups include alpha-chloracrylic acid and especially acid chlorides or esters of acryl acid, and also acid chlorides or esters of methacrylic acid. Preferred methacrylic acid esters are methyl, ethyl, propyl, isopropyl, n-butyl, tertiary or secondary butyl esters, most preferred are methyl and ethyl esters.

The amine and/or hydrazine content (if present) of the vinyl polymer is preferably at least 10 meq per 100 g polymer. The amine and/or hydrazine content (if present) of the vinyl polymer is preferably no more than 300, and more preferably no more than 200, meq per 100 g polymer.

Hydrazinolysis may be affected by dissolving or dispersing the vinyl polymer in a water-miscible alcohol or a water-alcohol mixture followed by the addition of hydrazine or hydrazine hydrate.

A vinyl polymer bearing carbonyl functionality, as well as latex polymers which do not contain carbonyl functionality, may be prepared by any suitable free-radical initiated polymerization technique, a free-radical initiator and appropriate heating (e.g., 40° C. to 90° C.) being employed. The polymerisation is normally effected in an aqueous medium, and in particular aqueous emulsion polymerisation is used to prepare the polymer with optionally conventional dispersants being used. Free radical initiators include hydrogen peroxide, t-butylhydroperoxide, persulphates such as $NH_4$ persulphate, K persulphate, and Na persulphate or a redox system may be used.

The molecular weight of vinyl polymers bearing carbonyl functional groups, as well as latex polymers which do not contain carbonyl functionality, of the present invention may vary widely and may be tailored for particular applications. In some embodiments, the vinyl polymers (or latex polymers) preferably have peak molecular weights ($M_p$) of at least 10,000 Daltons, more preferably at least 15,000 Daltons, and even more preferably at least 50,000 Daltons. In some embodiments, the vinyl polymers (or latex polymer) preferably have $M_p$ of less than 1,500,000 Daltons, more preferably less than 1,000,000 Daltons, and even more preferably less than 700,000 Daltons. $M_p$ of a vinyl polymer (or latex polymer), as defined herein, is the peak value obtained from a molecular weight distribution plot, which has weight fraction on ordinate (Y-axis) and specific molecular weight on abscissa (X-axis). Weight fraction is defined as a ratio of PU polymer of a specific molecular weight in a vinyl polymer (or latex polymer) sample to the total weight of the sample. For further discussion of $M_p$ and methods for determining $M_p$, see U.S. Pat. No. 5,534,310 (Rokowski et al.)

The vinyl polymers bearing carbonyl functional groups of the present invention, as well as latex polymers which do not contain carbonyl functionality, may be a multi-stage latex polymer. A multi-stage latex polymer bearing carbonyl functionality preferably includes 0.5 wt-% to 10 wt-% diacetone-acrylamide functional monomer, based on the total weight of the latex polymer. Exemplary multi-stage latex polymer compositions contain at least two polymers of different glass transition temperatures (i.e., different Tg values) and may be prepared via emulsion polymerization using many of the aforementioned monomers. In one preferred embodiment, the latex will include a first polymer stage (the "soft stage") having a Tg no greater than 50° C. (e.g., −65° C. to 50° C., more preferably −15° C. to 40° C., and even more preferably −5° C. to 30° C.), and a second polymer stage (the "hard stage") having a Tg greater than 30° C. (e.g., 30° C. to 230° C., more preferably 30° C. to 100° C., and even more preferably 40° C. to 90° C.).

Multi-stage latexes are conveniently produced by sequential monomer feeding techniques. For example, a first monomer composition is fed during the early stages of the polymerization, and then a second different monomer composition is fed during the later stages of the polymerization. In certain embodiments it may be favorable to start the polymerization with a high Tg monomer composition and then switch to a low Tg monomer composition, while in other embodiments, it may be favorable to start the polymerization with a low Tg monomer composition and then switch to a high Tg monomer composition.

Numerous hard and soft stages may also be utilized. For example, in certain compositions it may be beneficial to polymerize two different low Tg soft stage monomer compositions after the hard stage polymer is formed. The first soft stage may be for example prepared with a monomer whose homopolymer has a Tg close to room temperature (e.g., 20° C.) and the second soft stage may be prepared with monomer whose homopolymer has a Tg well below room temperature (e.g., less than 5° C.). While not intending to be bound by theory, it is believed that this second soft stage polymer assists with improving coalescence of the latex polymer particles.

It may be advantageous to use a gradient Tg latex polymer made using continuously varying monomer feeds. The resulting polymer will typically have a DSC curve that exhibits no Tg inflection points, and could be said to have an essentially infinite number of Tg stages. For example, one may start with a high Tg monomer composition and then at a certain point in the polymerization start to feed a low Tg soft stage monomer composition into the reactor with the high Tg hard stage monomer feed. The resulting multi-stage latex polymer will have a gradient Tg from high to low. A gradient Tg polymer may also be used in conjunction with multiple multi-stage Tg polymers. As an example, a high Tg monomer feed (F1) and a low Tg monomer feed (F2) can be prepared. The process would begin by adding feed F1 into the latex reactor vessel and initiate polymerization. After a certain period during the F1 feed, the feed F2 is added into F1 wherein the F2 feed rate is faster than the overall feed rate of F1+F2 into the reactor vessel. Consequently, once the F2 feed into F1 is complete, the overall Tg of the F1+F2 monomer feed blend will be a lower Tg "soft stage" monomer composition.

It may also be advantageous to use a gradient latex polymer, which would contain various levels of the carbonyl functional monomer throughout the polymer make-up. For example, one may start with a monomer composition substantially free or exempt of carbonyl-functional monomer and then at a certain point in the polymerization start to feed a monomer composition containing carbonyl-functional monomer into the low or exempt epoxy-functional monomer feed. It is believed that the resulting latex polymer will have a gradient of carbonyl functionality from low in the center of the polymer particle to high on the surface of the polymer particle where it is believed that it would be in a better position to react with the amine or hydrazide functional groups.

In another form of multi-stage vinyl latex polymer, preferably, a majority of the carbonyl-functional monomer is added to one the monomer feeds (i.e., at least one stage includes a high concentration of carbonyl functional monomer). Preferably, the concentrated monomer feed contains 100% of the carbonyl-functional monomer, more preferably it contains at least 95% of the carbonyl-functional monomer, and most preferably it contains at least 90% of the carbonyl-functional monomer used to make the completed vinyl polymer. For example, in a two-stage polymer the first 50% of the polymer is made with low levels of C=O (e.g., less than 40 wt-%, or less than 30 wt-%, or less than 20 wt-% of the carbonyl functionality is in this first stage), and the second 50% contains high levels of C=O (e.g., greater than 60 wt-%, or greater than 70 wt-%, or greater than 80 wt-% of the carbonyl functionality is in this second stage). It is believed that by concentrating the carbonyl-functional monomer in one of the monomer feeds, a high crosslink density can be obtained while minimizing the amount of high cost carbonyl functional monomer.

The disclosed multi-stage latex polymer compositions preferably include 5 wt-% to 95 wt-% soft stage or carbonyl concentrated polymer morphology, more preferably 30 wt-% to 80 wt-% soft stage or carbonyl concentrated polymer morphology, and most preferably 40 wt-% to 70 wt-% soft stage or carbonyl concentrated polymer morphology based on total polymer weight. The disclosed multi-stage latex polymer compositions preferably include 5 wt-% to 95 wt-% hard stage or low carbonyl concentrated polymer morphology, more preferably 20 wt-% to 70 wt-% hard stage or low carbonyl concentrated polymer morphology, and most preferably 30 wt-% to 60 wt-% hard stage or low carbonyl concentrated polymer morphology based on total polymer weight.

Compositions of this embodiment preferably include a multi-stage latex polymer in an amount of at least 10 wt-%, more preferably at least 25 wt-%, and even more preferably at least 35 wt-%, based on total solids of the composition. Compositions of this embodiment preferably include a multi-stage polymer in an amount of less than 100 wt-%, more preferably less than 85 wt-%, and even more preferably less than 80 wt-%, based on the total solids of the composition.

The latex polymers disclosed above (whether single-stage, multi-stage, containing carbonyl functional groups, or not bearing carbonyl functional groups) may be stabilized by one or more nonionic or anionic emulsifiers (e.g., surfactants), used either alone or together. Examples of suitable nonionic emulsifiers include tert-octylphenoxyethylpoly(39)ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene(20)sorbitan monolaurate, sucrose monococoate, di(2-butyl)phenoxypoly(20)ethoxyethanol, hydroxyethyl-cellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with ethylene oxide, N-polyoxyethylene(20)lauramide, N-lauryl-N-polyoxyethylene(3)amine and poly(10)ethylene glycol dodecyl thioether thioether. Examples of suitable anionic emulsifiers include sodium lauryl sulfate, sodium dodecylbenzene-sulfonate, potassium stearate, sodium dioctyl sulfosuccinate, sodium dodecyl-diphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, or ammonium salts of phosphate esters of ethoxylated nonylphenol or tridecyl alcohol, sodium octoxynol-3-sulfonate, sodium cocoyl sarcocinate, sodium 1-alkoxy-2-hydroxypropyl sulfonate, sodium alpha-olefin ($C_{14}$-$C_{16}$)sulfonate, sulfates of hydroxyalkanols, tetrasodium N-(1,2-dicarboxyethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate.

The multi-stage latex polymer, bearing carbonyl functional groups or not, may also be prepared with a high Tg alkali-soluble polymer hard stage. Alkali-soluble polymers may be prepared by making a polymer with acrylic or methacrylic acid or other polymerizable acid monomer (usually at greater than 7 weight %) and solubilizing the polymer by addition of ammonia or other base. Examples of suitable alkali-soluble high Tg support polymers include JONCRYL 675 and JONCRYL 678 oligomer resins, available from BASF. A low Tg soft stage monomer composition or gradient Tg composition could then be polymerized in the presence of the hard stage alkali-soluble polymer to prepare a multi-stage latex polymer. Another exemplary process for preparing alkali soluble supported polymers is described in U.S. Pat. No. 5,962,571. For coating compositions containing acetoacetyl-functional polymers (particularly clear coatings), the use of a nitrogen-free base (e.g., an inorganic metal base such as KOH, CaOH, NaOH, LiOH, etc.) may also be utilized.

Crosslinkers

Alternative to (or additional to) incorporating amine and/or hydrazine functional groups in the carbonyl-functional vinyl polymer (or a latex polymer without carbonyl functionality), amine and/or hydrazine functional groups may be present in one or more separate crosslinkers. In such embodiments, preferably, multi-functional amines (i.e., polyamines) and/or multi-functional hydrazines (i.e., polyhydrazines) used to crosslink carbonyl functional groups present in the composition are incorporated into the polyurethane and/or vinyl polymer components before mixing the components, or after or during the mixing of such components, as discrete entities.

Preferred multi-functional amines (i.e., polyamines) include, but are not limited to, those with primary and/or secondary amino groups having from 2 to 10 such amino groups per molecule. Especially preferred are primary amines. Suitable examples include ethylenediamine, 4-amino-1,8-octanediamino propylenediamine, decamethylene diamine, 1,2-diaminocyclohexane, isophoronediamine, urea, N-(2-hydroxyethyl)ethylenediamine, tris(2-aminoethyl)amine, melamine, diethylenetriamine, dipropylenetriamine dibutylenetriamine, polyethylene imines and Jeffamines (polyoxyethylene amines available from Huntsman Corporation, Houston, Tex.).

Preferred multi-functional hydrazines (i.e., polyhydrazines) include, but are not limited to, dicarboxylic acid bis-hydrazides, bis-hydrazones, specific examples being oxalic acid dihydrazide, malonic acid dihydrazide, succinic acid dihydrazide, adipic acid dihydrazide, and sebacic acid dihydrazide, cyclohexane dicarboxylic acid bis-hydrazides, azelaic acid bis-hydrazides; also carbonic acid hydrazides, bis-semicarbazides, trihydrazides, dihydrazinoalkones and dihydrazines of aromatic hydrocarbons, for example 1,4-dihydrazinobenzene and 2,3-dihydrazinonophthalene, dihydrazine and others known in the art. Preferred examples include adipic acid dihydrazide and carbonic acid dihydrazides.

If discrete multi-functional amines (i.e., polyamines) and/or multi-functional hydrazines (i.e., polyhydrazines) are added to the composition, the level is preferably that which provides at least 0.2, and more preferably at least 0.5, and most preferably at least 0.7, equivalent amine and/or hydrazine groups present per equivalent of carbonyl functional groups present in the composition.

If discrete multi-functional amines (i.e., polyamines) and/or multi-functional hydrazines (i.g., polyhydrazines) are added to the composition, the level is preferably that which provides no greater than 1.6, and more preferably no greater than 0.9, mole of amine and/or hydrazine groups present per mole of carbonyl functional groups present in the composition.

Optional Polymer Components

In addition to the water-dispersible PU polymer and vinyl polymer bearing carbonyl functional groups and/or latex polymer, the composition can include other polymers. Suitable such polymers include vinyl polymers not bearing carbonyl functional groups, polyurethane polymers (other than those water-dispersible PU polymers described above) not bearing carbonyl functional groups and/or bearing carbonyl functional groups. Other optional polymers include polyamide, polyepoxide, polyvinyl acetate, polyethylene, polystyrene, polybutadiene, polyvinyl chloride, polyacrylate, and other homopolymer and copolymer dispersions. Preferably the additional polymer is a polyurethane polymer (other than those water-dispersible PU polymers described above).

Such additional (optional) polymer may be a discrete polymer (i.e. not covalently bonded to the vinyl polymer bearing carbonyl functional groups), or it may be formed by in-situ polymerization in the presence of the vinyl polymer bearing carbonyl functional groups. Alternatively, the vinyl polymer bearing carbonyl functional groups is formed by in-situ polymerization in the presence of the additional (optional) polymer. Alternatively, the additional (optional) polymer may be grafted to the vinyl polymer bearing carbonyl functional groups, or it may be a copolymerized moiety of the vinyl polymer bearing carbonyl functional groups.

The weight ratio of the PU polymer and the vinyl polymer bearing carbonyl functional groups to other included (optional) polymers in the composition is preferably from 100:0 to 40:60, more preferably 100:0 to 70:30, most preferably 100:0.

Coating Compositions and Optional Additives

Coating compositions of the present invention may be formed using techniques and compositional ingredients that will be familiar to persons skilled in the art. For example, an aqueous dispersion of the PU polymer and an aqueous dispersion of the vinyl polymer may be mixed together with agitation. If the carbonyl-functional vinyl polymer does not include sufficient carbonyl-reactive amine and/or hydrazine functional groups, a crosslinker containing such groups may be added to the mixture. The aqueous dispersion may also contain water-miscible organic solvents.

The weight ratio of one or more PU polymers to one or more vinyl polymers bearing carbonyl functional groups in the composition is preferably within a range of from 90:10 to 10:90, and more preferably within a range of from 70:30 to 30:70.

Preferred pH ranges are 4 to 11, more preferably 6.5 to 9.5, and especially 7 to 8.5. Neutralization agents which may be applied include organic bases, for example hydroxides of lithium, sodium or potassium, and organic bases for example ammonia or tertiary amines for example dimethyl ethanol amine and triethylamine morpholine.

It is preferred to store the composition of the present invention in a closed container, where due to the low amount of oxygen no significant crosslinking of the composition has been found to occur until after application. However, this is by no means always necessary and indeed it is possible to use the invention composition soon after its production. After coating the composition the water evaporates, oxygen in the atmosphere initiates autoxidation and a dual crosslinking reaction takes place.

The aqueous compositions of the invention may be advantageously employed as coating compositions (e.g., protective or adhesive coating compositions, binding agents) for which purpose they may be further diluted with water and/or organic solvents, or they may be supplied in more concentrated form by evaporation of water and/or organic components of the liquid medium. As coating compositions, they may be applied to any substrate including wood, metals, glass, cloth, leather, paper, plastics, foam, and the like, by any conventional method including brushing, dipping, flow coating, spraying, and the like.

A coating composition of the present invention may include additional additives. Coating compositions of the present invention may also include other ingredients such as organic solvents, plasticizers, pigments, colorants, dyes, emulsifiers, surfactants, thickeners, heat stabilizers, leveling agents, anti-cratering agents, fillers, sedimentation inhibitors, ultraviolet-light absorbers, waxes, driers (i.e., drier salts), and the like, to modify properties. It is possible to include an amount of an antimony oxide in the dispersions to enhance the fire retardant properties. Additives such as heat stabilizers, ultraviolet-light absorbers, etc., can be dispersed in the reaction mixture and become an integral part of the polymer.

Although water-miscible organic solvents can be used, coating compositions of the present invention preferably include less than 30, more preferably less than 20, and even more preferably less than 10, weight percent (wt-%) volatile organic compounds (VOCs), based on the total weight of the composition.

Suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, and/or organic yellows (such as Hansa yellow), and combinations thereof.

Suitable driers include, for example, metal salts (typically, polyvalent salts) of cobalt, manganese, lead, zirconium, calcium, cerium, lanthanum, neodymium salts, and combinations thereof. Such driers can include anions such as halides, nitrates, sulphates, acetates, napthenates, and acetoacetonates. In some embodiments, metal driers may be used in combination with accelerators such as, for example, 1,10-phenanthroline, bipyridine, and the like. The amount of drier used is preferably in the range from 0 to 1% metal content by weight of the composition.

The compositions of the present invention preferably have a solids content of at least 20 percent by weight (wt-%), and more preferably at least 25 wt-%, based on the total weight of the composition. The compositions of the present invention preferably have a solids content of no more than 60 wt-%, and more preferably no more than 45 wt-%, based on the total weight of the composition.

There is still further provided according to the invention a coated substrate having a coating obtainable or derived from an aqueous crosslinkable coating composition as defined above, and the use of such a composition for coating a substrate.

Methods of Preparing Compositions

In one embodiment, there is provided a method of preparing an aqueous crosslinkable coating composition, the method comprising: providing an aqueous dispersion comprising a water-dispersible polyurethane polymer, comprising: a plurality of urethane linkages; a plurality of cycloaliphatic groups having the structure X-Z-X, wherein: Z is an aliphatic ring structure; each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and wherein at least one of the X groups is a divalent linkage group that attaches the cycloaliphatic group to another portion of the polyurethane polymer; a plurality of salt or salt-forming groups; and a plurality of air-curable ethylenically unsaturated groups and providing an aqueous dispersion of polymer particles comprising a carbonyl-functional vinyl polymer; providing carbonyl-reactive amine and/or hydrazine functional groups in a crosslinker distinct from either the polyurethane polymer or the carbonyl-functional vinyl polymer and/or incorporated within the carbonyl-functional vinyl polymer; combining the aqueous dispersion of the polyurethane polymer and the carbonyl-functional vinyl polymer to form a mixture; and if a distinct crosslinker is used, combining the mixture with the distinct crosslinker.

In certain embodiments, providing carbonyl-reactive amine and/or hydrazine functional groups comprises providing a crosslinker comprising the carbonyl-reactive amine and/or hydrazine functional groups, and combining the crosslinker with the mixture comprising the water-dispersible polyurethane polymer and the carbonyl-functional vinyl polymer.

In another embodiment, there is provided a method of preparing an aqueous crosslinkable coating composition, the method comprising: providing a carbonyl-functional vinyl polymer; preparing a water-dispersible polyurethane polymer in the presence of the carbonyl-functional vinyl polymer and combining the mixture with water, wherein the water-dispersible polyurethane comprises: a plurality of urethane linkages; a plurality of cycloaliphatic groups having the structure X-Z-X, wherein: Z is an aliphatic ring structure; each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and wherein at least one of the X groups is a divalent linkage group that attaches the cycloaliphatic group to another portion of the polyurethane polymer; a plurality of salt or salt-forming groups; and a plurality of air-curable ethylenically unsaturated groups; and providing carbonyl-reactive amine and/or hydrazine functional groups in a crosslinker distinct from either the polyurethane polymer or the carbonyl-functional vinyl polymer and/or incorporated within the carbonyl-functional vinyl polymer; and if a distinct crosslinker is used, combining the aqueous dispersion of the polyurethane polymer and the carbonyl-functional vinyl polymer with the distinct crosslinker.

In another embodiment, there is provided a method of preparing an aqueous crosslinkable coating composition, the method comprising: providing an aqueous dispersion of polymer particles comprising a carbonyl-functional vinyl polymer; preparing a water-dispersible polyurethane prepolymer; combining the water-dispersible polyurethane prepolymer with the aqueous dispersion of polymer particles comprising a carbonyl-functional vinyl polymer; and forming a water-dispersible polyurethane polymer from the polyurethane prepolymer in the presence of the polymer particles comprising a carbonyl-functional vinyl polymer, and providing carbonyl-reactive amine and/or hydrazine functional groups in a crosslinker distinct from either the polyurethane polymer or the carbonyl-functional vinyl polymer and/or incorporated within the carbonyl-functional vinyl polymer; and if a distinct crosslinker is used, combining the aqueous dispersion of the polyurethane polymer and the carbonyl-functional vinyl polymer with the distinct crosslinker. The water-dispersible polyurethane comprises: a plurality of urethane linkages; a plurality of cycloaliphatic groups having the structure X-Z-X, wherein: Z is an aliphatic ring structure; each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and wherein at least one of the X groups is a divalent linkage group that attaches the cycloaliphatic group to another portion of the polyurethane polymer; a plurality of salt or salt-forming groups; and a plurality of air-curable ethylenically unsaturated groups.

In another embodiment, there is provided a method of preparing an aqueous crosslinkable coating composition, the method comprising:

providing a latex polymer; preparing a water-dispersible polyurethane prepolymer; combining the latex polymer and the polyurethane prepolymer; and forming a water-dispersible polyurethane polymer from the polyurethane prepolymer in the presence of the latex polymer, wherein the water-dispersible polyurethane comprises: a plurality of urethane linkages; a plurality of cycloaliphatic groups having the structure X-Z-X, wherein: Z is an aliphatic ring structure; each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and wherein at least one of the X groups is a divalent linkage group that attaches the cycloaliphatic group to another portion of the polyurethane polymer; a plurality of salt or salt-forming groups; and a plurality of air-curable ethylenically unsaturated groups.

Exemplary Embodiments

The present invention provides the following exemplary numbered embodiments.

1. An aqueous crosslinkable coating composition comprising:
   water;
   a water-dispersible polyurethane polymer, comprising:
   a plurality of urethane linkages;
   a plurality of cycloaliphatic groups having the structure X-Z-X, wherein:
      Z is an aliphatic ring structure;
      each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and
      wherein at least one of the X groups is a divalent linkage group that attaches the cycloaliphatic group to another portion of the polyurethane polymer;
   a plurality of salt or salt-forming groups; and
   a plurality of air-curable ethylenically unsaturated groups; and
   a carbonyl-functional vinyl polymer; and
   carbonyl-reactive amine and/or hydrazine functional groups.

2. The composition of embodiment 1 wherein the carbonyl-reactive amine and/or hydrazine functional groups are incorporated within the vinyl polymer.

3. The composition of embodiment 2 wherein the amine and/or hydrazine content of the vinyl polymer is 10 to 300 milliequivalents per 100 grams polymer.

4. The composition of embodiments 1 through 3 wherein the carbonyl-reactive amine and/or hydrazine functional groups are in a crosslinker distinct from the vinyl polymer and the polyurethane polymer.

5. The composition of embodiment 4 wherein the crosslinker is a multi-functional amine comprising 2 to 10 primary amino groups per molecule.

6. The composition of embodiment 4 wherein the crosslinker is a multi-functional hydrazine.

7. The composition of embodiment 4 wherein the level of crosslinker in the composition is that which provides at least 0.2 equivalent amine and/or hydrazine groups per mole of carbonyl functional groups present in the composition.

8. The composition of any one of embodiments 1 through 7 wherein the weight ratio of the polyurethane polymer to the vinyl polymer bearing carbonyl functional groups in the composition is within a range of from 90:10 to 10:90.

9. The composition of any one of embodiments 1 through 8 wherein the solids content is 20 wt-% to 60 wt-%, based on the total weight of the composition.

10. The composition of any one of embodiments 1 through 9 comprising less than 30 wt-% volatile organic compounds, based on the total weight of the composition.

11. The composition of any one of embodiments 1 through 8 wherein the vinyl polymer bearing carbonyl functional groups is formed by free-radical addition polymerization of at least one carbonyl-containing monoethylenically unsaturated monomer with at least one other olefinically unsaturated monomer not providing carbonyl functionality.

12. The composition of any one of embodiments 1 through 11 wherein the amount of carbonyl functional groups in the vinyl polymer is 3-500 milliequivalents per 100 grams polymer.

13. The composition of any one of embodiments 1 through 12 wherein the polyurethane polymer includes at least 3 wt-% of cycloaliphatic-group-containing compound containing the X-Z-X structure, based on the total dry weight of the polyurethane polymer.

14. The composition of any one of embodiments 1 through 13 wherein the cycloaliphatic groups are located on a backbone of the polyurethane polymer.

15. The composition of any one of embodiments 1 through 14 wherein the polyurethane polymer further comprises one or more additional linkage groups selected from a group consisting of ester groups, ether groups, urea groups, amide groups, carbonate groups, and combinations thereof.

16. The composition of any one of embodiments 1 through 15 wherein Z comprises a closed six-member ring.

17. The composition of any one of embodiments 1 through 16 wherein at least a portion of the air-curable ethylenically unsaturated groups are provided by a fatty acid.

18. The composition of any one of the embodiments 1 through 17 wherein the carbonyl-functional vinyl polymer is a multi-stage latex polymer.

19. The composition of embodiment 18 wherein the multi-stage vinyl latex polymer includes at least one soft stage having a Tg of −65° C. to 50° C., and at least one hard stage having a Tg of 30° C. to 230° C.

20. The composition of embodiment 18 or embodiment 19 wherein the multi-stage vinyl latex polymer includes at least one stage having a concentration of carbonyl functional monomer feed containing 90% to 100% of the carbonyl-functional monomer used to make the completed vinyl polymer.

21. A method of coating a substrate, the method comprising applying an aqueous crosslinkable coating composition of any one of embodiments 1 through 20, and removing the water.

22. A coated substrate preparable by the method of embodiment 21.

23. A method of preparing an aqueous crosslinkable coating composition, the method comprising:
   providing an aqueous dispersion comprising a water-dispersible polyurethane polymer, comprising:
   a plurality of urethane linkages;
   a plurality of cycloaliphatic groups having the structure X-Z-X, wherein:
      Z is an aliphatic ring structure;
      each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and
      wherein at least one of the X groups is a divalent linkage group that attaches the cycloaliphatic group to another portion of the polyurethane polymer;
   a plurality of salt or salt-forming groups; and
   a plurality of air-curable ethylenically unsaturated groups and;
   providing an aqueous dispersion of polymer particles comprising a carbonyl-functional vinyl polymer;
   providing carbonyl-reactive amine and/or hydrazine functional groups in a crosslinker distinct from either the polyurethane polymer or the carbonyl-functional vinyl polymer and/or incorporated within the carbonyl-functional vinyl polymer;

combining the aqueous dispersion of the polyurethane polymer and the carbonyl-functional vinyl polymer to form a mixture; and if a distinct crosslinker is used, combining the mixture with the distinct crosslinker.

24. The method of embodiment 23 wherein providing carbonyl-reactive amine and/or hydrazine functional groups comprises providing a crosslinker comprising the carbonyl-reactive amine and/or hydrazine functional groups, and the method comprises combining the mixture with the crosslinker.

25. A method of preparing an aqueous crosslinkable coating composition, the method comprising:
   providing a carbonyl-functional vinyl polymer;
   preparing a water-dispersible polyurethane polymer in the presence of the carbonyl-functional vinyl polymer and combining the mixture with water, wherein the water-dispersible polyurethane comprises:
      a plurality of urethane linkages;
      a plurality of cycloaliphatic groups having the structure X-Z-X, wherein:
         Z is an aliphatic ring structure;
         each X is a group independently selected from an ester group, an ether group, an amide group, a carbonate group, hydrogen, or CR, where R is independently selected from hydrogen, a halogen, oxygen, nitrogen, an organic group, or a combination thereof, and n is 0, 1, or 2; and
         wherein at least one of the X groups is a divalent linkage group that attaches the cycloaliphatic group to another portion of the polyurethane polymer;
      a plurality of salt or salt-forming groups; and
      a plurality of air-curable ethylenically unsaturated groups; and
   providing carbonyl-reactive amine and/or hydrazine functional groups in a crosslinker distinct from either the polyurethane polymer or the carbonyl-functional vinyl polymer and/or incorporated within the carbonyl-functional vinyl polymer; and
   if a distinct crosslinker is used, combining the aqueous dispersion of the polyurethane polymer and the carbonyl-functional vinyl polymer with the distinct crosslinker.

26. A method of preparing an aqueous crosslinkable coating composition, the method comprising:
   providing an aqueous dispersion of polymer particles comprising a carbonyl-functional vinyl polymer;
   preparing a water-dispersible polyurethane prepolymer;
   combining the water-dispersible polyurethane prepolymer with the aqueous dispersion of polymer particles comprising a carbonyl-functional vinyl polymer; and
   forming a water-dispersible polyurethane polymer from the polyurethane prepolymer in the presence of the polymer particles comprising a carbonyl-functional vinyl polymer, wherein the water-dispersible polyurethane comprises:
      a plurality of urethane linkages;
      a plurality of cycloaliphatic groups having the structure X-Z-X, wherein:
         Z is an aliphatic ring structure;
         each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and
         wherein at least one of the X groups is a divalent linkage group that attaches the cycloaliphatic group to another portion of the polyurethane polymer;
      a plurality of salt or salt-forming groups; and
      a plurality of air-curable ethylenically unsaturated groups; and
   providing carbonyl-reactive amine and/or hydrazine functional groups in a crosslinker distinct from either the polyurethane polymer or the carbonyl-functional vinyl polymer and/or incorporated within the carbonyl-functional vinyl polymer; and
   if a distinct crosslinker is used, combining the aqueous dispersion of the polyurethane polymer and the carbonyl-functional vinyl polymer with the distinct crosslinker.

27. A method of preparing an aqueous crosslinkable coating composition, the method comprising:
   providing a latex polymer;
   preparing a water-dispersible polyurethane prepolymer;
   combining the latex polymer and the polyurethane prepolymer; and
   forming a water-dispersible polyurethane polymer from the polyurethane prepolymer in the presence of the latex polymer, wherein the water-dispersible polyurethane comprises:
      a plurality of urethane linkages;
      a plurality of cycloaliphatic groups having the structure X-Z-X, wherein:
         Z is an aliphatic ring structure;
         each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and
         wherein at least one of the X groups is a divalent linkage group that attaches the cycloaliphatic group to another portion of the polyurethane polymer;
      a plurality of salt or salt-forming groups; and
      a plurality of air-curable ethylenically unsaturated groups.

28. The method of embodiment 27 further comprising:
   providing carbonyl-reactive amine and/or hydrazine functional groups in a crosslinker distinct from either the polyurethane polymer or the latex polymer; and
   combining the aqueous dispersion of the polyurethane polymer and the latex polymer with a distinct crosslinker.

29. An aqueous crosslinkable coating composition preparable by the method of any one of embodiments 23 through 28.

30. An aqueous crosslinkable coating composition comprising:
   a latex polymer; and
   a water-dispersible polyurethane polymer, comprising:
      a plurality of urethane linkages;
      a plurality of cycloaliphatic groups having the structure X-Z-X, wherein:
         Z is an aliphatic ring structure;
         each X is a group independently selected from an ester group, an ether group, an amide group, a carbonate group, hydrogen, or $CR_n$, where R is independently selected from hydrogen, a halogen, oxygen, nitrogen, an organic group, or a combination thereof, and n is 0, 1, or 2; and
         wherein at least one of the X groups is a divalent linkage group that attaches the cycloaliphatic group to another portion of the polyurethane polymer;
      a plurality of salt or salt-forming groups; and
      a plurality of air-curable ethylenically unsaturated groups.

31. The composition of embodiment 30 wherein the latex polymer is a carbonyl-functional latex polymer.

32. The composition of embodiment 31 wherein the latex polymer is a carbonyl-functional vinyl latex polymer.

33. The composition of embodiment 30 further comprising:
   a carbonyl-functional vinyl polymer distinct from the latex polymer; and
   carbonyl-reactive amine and/or hydrazine functional groups.
34. The composition of embodiment 33 wherein the carbonyl-reactive amine and/or hydrazine functional groups are incorporated within the vinyl polymer and/or the latex polymer.
35. The composition of embodiment 34 wherein the amine and/or hydrazine content of the polymer is 10 to 300 milliequivalents per 100 grams polymer.
36. The composition of embodiments 33 through 35 wherein the carbonyl-reactive amine and/or hydrazine functional groups are in a crosslinker distinct from the vinyl polymer, the latex polymer, and the polyurethane polymer.
37. The composition of embodiment 36 wherein the crosslinker is a multi-functional amine comprising 2 to 10 primary amino groups per molecule.
38. The composition of embodiment 36 wherein the crosslinker is a multi-functional hydrazine.
39. The composition of embodiment 36 wherein the level of crosslinker in the composition is that which provides at least 0.2 equivalent amine and/or hydrazine groups per mole of carbonyl functional groups present in the composition.
40. The composition of any one of embodiments 33 through 39 wherein the weight ratio of the polyurethane polymer to the vinyl polymer bearing carbonyl functional groups in the composition is within a range of from 90:10 to 10:90.
41. The composition of any one of the embodiments 33 through 40 wherein the carbonyl-functional vinyl polymer is a multi-stage latex polymer.
42. The composition of embodiment 41 wherein the multi-stage vinyl latex polymer includes at least one soft stage having a Tg of −65° C. to 50° C., and at least one hard stage having a Tg of 30° C. to 230° C.
43. The composition of embodiment 41 or embodiment 42 wherein the multi-stage vinyl latex polymer includes at least one stage having a concentration of carbonyl functional monomer feed containing 90% to 100% of the carbonyl-functional monomer used to make the completed vinyl polymer.
44. The composition of any one of embodiments 33 through 43 wherein the vinyl polymer bearing carbonyl functional groups is formed by free-radical addition polymerization of at least one carbonyl-containing monoethylenically unsaturated monomer with at least one other olefinically unsaturated monomer not providing carbonyl functionality.
45. The composition of any one of embodiments 33 through 44 wherein the amount of carbonyl functional groups in the vinyl polymer is 3-500 milliequivalents per 100 grams polymer.
46. The composition of any one of embodiments 30 through 45 wherein the solids content is 20 wt-% to 60 wt-%, based on the total weight of the composition.
47. The composition of any one of embodiments 30 through 46 comprising less than 30 wt-% volatile organic compounds, based on the total weight of the composition.
48. The composition of any one of embodiments 30 through 47 wherein the polyurethane polymer includes at least 3 wt-% of cycloaliphatic-group-containing compound containing the X-Z-X structure, based on the total dry weight of the polyurethane polymer.
49. The composition of any one of embodiments 30 through 48 wherein the cycloaliphatic groups are located on a backbone of the polyurethane polymer.
50. The composition of any one of embodiments 30 through 49 wherein the polyurethane polymer further comprises one or more additional linkage groups selected from a group consisting of ester groups, ether groups, urea groups, amide groups, carbonate groups, and combinations thereof.
51. The composition of any one of embodiments 30 through 50 wherein Z comprises a closed six-member ring.
52. The composition of any one of embodiments 30 through 51 wherein at least a portion of the air-curable ethylenically unsaturated groups are provided by a fatty acid.
53. A method of coating a substrate, the method comprising applying an aqueous crosslinkable coating composition of any one of embodiments 30 through 52, and removing the water.
54. A coated substrate preparable by the method of embodiment 53.

EXAMPLES

Objects and advantages of this invention are further illustrated by the following examples, but the particular materials and amounts thereof recited in these examples, as well as other conditions and details, should not be construed to unduly limit this invention.

Unless otherwise noted, all parts, percentages, and ratios reported in the following examples are on a weight basis, and all reagents used in the examples were obtained, or are available, from the chemical suppliers described below, or may be synthesized by conventional techniques.

Example 1

A PU dispersion was prepared by combining a dihydroxy carboxylic acid compound (dimethylol propionic acid), a polyester compound (neopentyl glycol/adipic acid), an isocyanate compound (DESMODUR W), an alkyd-based polyol, and n-methylpyrollidone solvent. The alkyd-based polyol was derived from a cyclohexane compound (cyclohexane dicarboxylic acid) (having a structure X-Z-X), an ethylenically-unsaturated fatty acid compound (soya fatty acids), and a tri-functional polyol (trimethylol propane). The isocyanate compound was provided in an excess amount relative to the isocyanate-reactive hydroxyl groups. Table 1 lists the relative concentrations of the reaction components, based on the dry weight of the reaction components.

TABLE 1

| Component | Percent by weight |
| --- | --- |
| Dihydroxycarboxylic acid | 6.0 |
| Alkyd-based polyol | 45.7 |
| Polyester | 8.0 |
| Isocyanate | 40.3 |

The reaction components were heated to 80° C. whereupon dibutyl tin dilaurate was added and the reaction was processed until substantially all of the isocyanate-reactive hydroxyl groups were reacted with the isocyanate compounds. The resulting PU prepolymer mixture was then cooled to about 65° C., thereby providing prepolymers having cyclohexane groups, ethylenically-unsaturated groups, carboxylic acid salt-forming groups, and terminal and/or pendant isocyanate groups. Because an excess amount of the isocyanate compound was used, the resulting prepolymers were substantially free of isocyanate-reactive hydroxyl groups.

Triethylamine was then added to react with the carboxylic acid groups to form salts groups on the PU prepolymers. The PU prepolymers were then dispersed into chilled deionized water, and reacted with ethylenediamine to chain extend the PU prepolymers to form the PU polymer having urethane linkages. Manganese drier was then added, and the PU polymer dispersion was adjusted to 33% solids.

The PU polymer dispersion was subsequently coated onto a substrate, and dried. The drying caused the ethylenically-unsaturated groups of the PU polymer to crosslink, thereby strengthening the resulting coating. The combined concentrations of the cyclohexane groups (about 7 weight percent) and the ethylenically-unsaturated fatty acid groups (about 26 weight percent) in the PU polymer was greater than 30% by weight of the PU polymer, based on a dry weight of the PU polymer. As discussed above, this allowed the resulting coating to exhibit good balance of flexibility and hardness, good adhesion to the substrate, and good chemical resistance.

Example 2

A reactor was charged with 694 parts of deionized water and 15 parts CO-436 ammonium nonylphenol ether sulfate (Rhodia). The reaction mixture was heated to 75° C. under a nitrogen blanket. During heating, a pre-emulsion was formed containing 297 parts of deionized water, 15 parts of CO-436, 500 parts of butyl methacrylate, 0.5 parts of butyl acrylate, 140 parts of styrene, 35 parts of diacetone acrylamide and 25 parts of methacrylic acid. Once the reaction mixture reached 75° C., 2.8 parts of ammonium persulfate was added to the reactor and the monomer feed started for a 2 hour feed rate. The reaction temperature was held between 80° C. to 85° C. during polymerization. Once the pre-emulsion feed was complete, the container was rinsed with 20 parts of deionized water and the reaction was held 30 minutes. The resulting latex polymer was then cooled to 40° C., 10.4 parts of adipic dihydrazide was added, 28% concentrated ammonia was added to adjust the pH to 7.5, and deionized water was added to adjust the weight solids to 40%.

Example 3

A reactor was charged with 772 parts of deionized water and 16.8 parts CO-436 ammonium nonylphenol ether sulfate (Rhodia). The reaction mixture was heated to 75° C. under a nitrogen blanket. During heating, a pre-emulsion was formed containing 330 parts of deionized water, 16.8 parts of CO-436, 571 parts of butyl methacrylate, 178 parts of styrene, and 27.2 parts of methacrylic acid. Once the reaction mixture reached 75° C., 3.1 parts of ammonium persulfate was added to the reactor and the monomer feed started for a 2 hour feed rate. The reaction temperature was held between 80° C. to 85° C. during polymerization. Once the pre-emulsion feed was complete, the container was rinsed with 20 parts of deionized water and the reaction was held 30 minutes. The resulting latex polymer was then cooled to 40° C., 28% concentrated ammonia was added to adjust the pH to 7.5 and deionized water was added to adjust the weight solids to 40%.

Example 4

A reactor was charged with 861 parts of deionized water and 9.7 parts CO-436 ammonium nonylphenol ether sulfate (Rhodia). The reaction mixture was heated to 75° C. under a nitrogen blanket. During heating, a pre-emulsion was formed containing 257 parts of deionized water, 0.9 parts ammonium persulfate, 14.6 parts of CO-436, 303 parts of butyl acrylate, 456 parts of methylmetacrylate, and 23.5 parts of methacrylic acid. Once the reaction mixture reached 75° C., 2.2 parts of ammonium persulfate was added to the reactor and the monomer feed started for a 2.5 hour feed rate. The reaction temperature was held between 80° C. to 85° C. during polymerization. Once the pre-emulsion feed was complete, the container was rinsed with 18 parts of deionized water and the reaction was held 30 minutes. The resulting latex polymer was then cooled to 40° C., 28% concentrated ammonia was added to adjust the pH to 7.0 and deionized water was added to adjust the weight solids to 40%.

Example 5

A reactor was charged with 864 parts of deionized water and 9.6 parts CO-436 ammonium nonylphenol ether sulfate (Rhodia). The reaction mixture was heated to 75° C. under a nitrogen blanket. During heating, a pre-emulsion was formed containing 254 parts of deionized water, 0.9 grams of ammonium persulfate, 14.4 parts of CO-436, 294 parts of butyl acrylate, 425 parts of methyl methacrylate, 31 parts diacetone acrylamide, and 23.2 parts of methacrylic acid. Once the reaction mixture reached 75° C., 2.2 parts of ammonium persulfate was added to the reactor and the monomer feed started for a 2.5 hour feed rate. The reaction temperature was held between 80° C. to 85° C. during polymerization. Once the pre-emulsion feed was complete, the container was rinsed with 18 parts of deionized water and the reaction was held 30 minutes. The resulting latex polymer was then cooled to 40° C., 9.2 parts adipidic dihydrazide was added, 28% concentrated ammonia was added to adjust the pH to 7.3, and deionized water was added to adjust the weight solids to 40%.

Example 6

A PU/Acrylic dispersion was prepared by dispersing 596 parts of PU prepolymer from Example 1 into 794 parts deionized water and 530 parts latex from Example 2 and then was reacted with ethylenediamine to chain extend the PU prepolymers to form the PU polymer having urethane linkages. Manganese drier was then added, and the PU polymer dispersion was adjusted to 35% solids.

Example 7

A PU/Acrylic dispersion was prepared by dispersing 596 parts of PU prepolymer from Example 1 into 794 parts deionized water and 530 parts latex from Example 3 and then was reacted with ethylenediamine to chain extend the PU prepolymers to form the PU polymer having urethane linkages. Manganese drier was then added, and the PU polymer dispersion was adjusted to 35% solids.

Example 8

A PU/Acrylic dispersion was prepared by mixing 212 parts of the final PU from Example 1 with 75 parts of the latex of Example 2.

Example 9

A PU/Acrylic dispersion was prepared by mixing 212 parts of the final PU from Example 1 with 75 parts of the latex of Example 3.

Example 10

A PU/Acrylic dispersion was prepared by mixing 75 parts on solids of the final PU from Example 1 with 25 parts on solids of the latex of Example 4.

Example 11

A PU/Acrylic dispersion was prepared by mixing 50 parts on solids of the final PU from Example 1 with 50 parts on solids of the latex of Example 4.

Example 12

A PU/Acrylic dispersion was prepared by mixing 25 parts on solids of the final PU from Example 1 with 75 parts on solids of the latex of Example 4.

Example 13

A PU/Acrylic dispersion was prepared by mixing 212 parts on solids of the final PU from Example 1 with 75 parts on solids of the latex of Example 5.

Example 14

A PU/Acrylic dispersion was prepared by mixing 212 parts on solids of the final PU from Example 1 with 75 parts on solids of the latex of Example 5.

Example 15

A PU/Acrylic dispersion was prepared by mixing 212 parts on solids of the final PU from Example 1 with 75 parts on solids of the latex of Example 5.

Example 16

Dispersions from Examples 6-9 were applied to opacity drawdown charts from Byk-Gardner (Columbia, Md.) with a 7 mil (0.1778 mm) Bird Bar applicator. Samples were allowed to dry for 3 days and then tested for MEK resistance via double rubs per ASTM test method D5402.

|            | Ex. 6 | Ex. 7 | Ex. 8              | Ex. 9             |
|------------|-------|-------|--------------------|-------------------|
| MEK 2x Rubs | >100  | >100  | Film break at 100 rubs | Film break at 90 rubs |

Results from Example 7 demonstrate improved performance may be obtained by a latex polymer which does not contain carbonyl functionality provided the polyurethane prepolymer is chain extended in the presence of the latex polymer to form the water dispersible polyurethane.

Example 17

Dispersions from Examples 10-15 were applied to opacity drawdown charts from Byk-Gardner (Columbia, Md.) with a 7 mil (0.1778 mm) Bird Bar applicator. Samples were allowed to dry for 3 days at room temperature and at 105° F. and then tested for MEK resistance via double rubs per ASTM test method D5402.

|                     | Ex. 10 | Ex. 11 | Ex. 12            | Ex. 13 | Ex. 14 | Ex. 15 |
|---------------------|--------|--------|-------------------|--------|--------|--------|
| MEK 2x Rubs RT      | 45     | 20     | Poor coalescence  | 66     | 60     | 57     |
| MEK 2x Rubs 105° F. | 75     | 52     | 40                | 100    | 80     | 70     |

A comparison of the results from Examples 10-12 with the results from Examples 13-14 demonstrates that additional carbonyl functional polymer may be added to the water dispersible polyurethane with a lesser decrease in film performance as measured by MEK double rubs, as compared to the addition of a polymer which does not comprise carbonyl functionality.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. An aqueous crosslinkable coating composition comprising:
    water;
    a water-dispersible polyurethane polymer, comprising:
        a plurality of urethane linkages;
        a plurality of cycloaliphatic groups incorporated into the polyurethane polymer through cyclohexane diacid, non-isocyanate compounds, wherein at least one of the plurality of cycloaliphatic groups comprises a structure X-Z-X, and wherein: Z is the cyclohexane ring structure; and each X is an ester group, wherein at least one of the X groups is a divalent linkage group attaches the cyclohexane ring structure to another portion of the polyurethane polymer;
        a plurality of salt or salt-forming groups; and
        a plurality of air-curable ethylenically unsaturated groups; and
    a carbonyl-functional vinyl polymer, wherein the amount of carbonyl functional groups in the vinyl polymer is 3-500 milliequivalents per 100 grams polymer; and
    carbonyl-reactive amine and/or hydrazine functional groups.

2. The composition of claim 1 wherein the carbonyl-reactive amine and/or hydrazine functional groups are incorporated within the vinyl polymer.

3. The composition of claim 2 wherein the amine and/or hydrazine content of the vinyl polymer is 10 to 300 milliequivalents per 100 grams polymer.

4. The composition of claim 1 wherein the carbonyl-reactive amine and/or hydrazine functional groups are in a crosslinker distinct from the vinyl polymer and the polyurethane polymer.

5. The composition of claim 4 wherein the crosslinker is a multi-functional amine comprising 2 to 10 primary amino groups per molecule.

6. The composition of claim 4 wherein the crosslinker is a multi-functional hydrazine.

7. The composition of claim 4 wherein the level of crosslinker in the composition is that which provides at least 0.2 equivalent amine and/or hydrazine groups per mole of carbonyl functional groups present in the composition.

8. The composition of claim 1 comprising an aqueous dispersion of polymer particles comprising the carbonyl-functional vinyl polymer.

9. The composition of claim 1 wherein the polyurethane polymer includes at least 3 wt-% of cycloaliphatic-group-containing compound having the X-Z-X structure, based on the total dry weight of the polyurethane polymer.

10. The composition of claim 1 wherein Z comprises a closed six-member ring.

11. The composition claim 1 wherein at least a portion of the air-curable ethylenically unsaturated groups are provided by a fatty acid.

12. A method of preparing an aqueous crosslinkable coating composition, the method comprising:
 providing an aqueous dispersion comprising a water-dispersible polyurethane polymer, comprising:
  a plurality of urethane linkages;
  a plurality of cycloaliphatic groups incorporated into the polyurethane polymer through cyclohexane diacid, non-isocyanate compounds, wherein at least one of the plurality of cycloaliphatic groups comprises a structure X-Z-X, and wherein: Z is the cyclohexane ring structure; and each X is an ester group, wherein at least one of the X groups is a divalent linkage group attaches the cyclohexane ring structure to another portion of the polyurethane polymer;
  a plurality of salt or salt-forming groups; and
  a plurality of air-curable ethylenically unsaturated groups; and
 providing an aqueous dispersion of polymer particles comprising a carbonyl-functional vinyl polymer;
 providing carbonyl-reactive amine and/or hydrazine functional groups in a crosslinker distinct from either the polyurethane polymer or the carbonyl-functional vinyl polymer and/or incorporated within the carbonyl-functional vinyl polymer;
 combining the aqueous dispersion of the polyurethane polymer and the carbonyl-functional vinyl polymer to form a mixture; and
 if a distinct crosslinker is used, combining the mixture with the distinct crosslinker.

13. The method of claim 12 wherein providing carbonyl-reactive amine and/or hydrazine functional groups comprises providing a crosslinker comprising the carbonyl-reactive amine and/or hydrazine functional groups, and the method comprises combining the mixture with the crosslinker.

14. A method of preparing an aqueous crosslinkable coating composition, the method comprising:
 providing a carbonyl-functional vinyl polymer, wherein the amount of carbonyl functional groups in the vinyl polymer is 3-500 milliequivalents per 100 grams polymer;
 preparing a water-dispersible polyurethane polymer in the presence of the carbonyl-functional vinyl polymer and combining the mixture with water, wherein the water-dispersible polyurethane comprises:
  a plurality of urethane linkages;
  a plurality of cycloaliphatic groups incorporated into the polyurethane polymer through cyclohexane diacid, non-isocyanate compounds, wherein at least one of the plurality of cycloaliphatic groups comprises a structure X-Z-X, and wherein: Z is the cyclohexane ring structure; and each X is an ester group, wherein at least one of the X groups is a divalent linkage group attaches the cyclohexane ring structure to another portion of the polyurethane polymer;
  a plurality of salt or salt-forming groups; and
  a plurality of air-curable ethylenically unsaturated groups; and
 providing carbonyl-reactive amine and/or hydrazine functional groups in a crosslinker distinct from either the polyurethane polymer or the carbonyl-functional vinyl polymer and/or incorporated within the carbonyl-functional vinyl polymer; and
 if a distinct crosslinker is used, combining the aqueous dispersion of the polyurethane polymer and the carbonyl-functional vinyl polymer with the distinct crosslinker.

15. A method of preparing an aqueous crosslinkable coating composition, the method comprising:
 providing an aqueous dispersion of polymer particles comprising a carbonyl-functional vinyl polymer;
 preparing a water-dispersible polyurethane prepolymer;
 combining the water-dispersible polyurethane prepolymer with the aqueous dispersion of polymer particles comprising a carbonyl-functional vinyl polymer; and
 forming a water-dispersible polyurethane polymer from the polyurethane prepolymer in the presence of the polymer particles comprising a carbonyl-functional vinyl polymer, wherein the water-dispersible polyurethane comprises:
  a plurality of urethane linkages;
  a plurality of cycloaliphatic groups incorporated into the polyurethane polymer through cyclohexane diacid, non-isocyanate compounds, wherein at least one of the plurality of cycloaliphatic groups comprises a structure X-Z-X, and wherein: Z is the cyclohexane ring structure; and each X is an ester group, wherein at least one of the X groups is a divalent linkage group attaches the cyclohexane ring structure to another portion of the polyurethane polymer;
  a plurality of salt or salt-forming groups; and
  a plurality of air-curable ethylenically unsaturated groups; and
 providing carbonyl-reactive amine and/or hydrazine functional groups in a crosslinker distinct from either the polyurethane polymer or the carbonyl-functional vinyl polymer and/or incorporated within the carbonyl-functional vinyl polymer; and
 if a distinct crosslinker is used, combining the aqueous dispersion of the polyurethane polymer and the carbonyl-functional vinyl polymer with the distinct crosslinker.

16. A method of preparing an aqueous crosslinkable coating composition, the method comprising:
 providing a latex polymer;
 preparing a water-dispersible polyurethane prepolymer;
 combining the latex polymer and the polyurethane prepolymer; and
 forming a water-dispersible polyurethane polymer from the polyurethane prepolymer in the presence of the latex polymer, wherein the water-dispersible polyurethane comprises:
  a plurality of urethane linkages;
  a plurality of cycloaliphatic groups incorporated into the polyurethane polymer through cyclohexane diacid, non-isocyanate compounds, wherein at least one of the plurality of cycloaliphatic groups comprises a structure X-Z-X, and wherein: Z is the cyclohexane ring structure; and each X is an ester group, wherein at least one of the X groups is a divalent linkage group attaches the cyclohexane ring structure to another portion of the polyurethane polymer;
a plurality of salt or salt-forming groups; and
a plurality of air-curable ethylenically unsaturated groups.

17. An aqueous crosslinkable coating composition preparable by the method of claim 13.

18. An aqueous crosslinkable coating composition comprising:
a latex polymer; and
a water-dispersible polyurethane polymer, comprising:
a plurality of urethane linkages;
a plurality of cycloaliphatic groups incorporated into the polyurethane polymer through cyclohexane diacid, non-isocyanate compounds, wherein at least one of the plurality of cycloaliphatic groups comprises a structure X-Z-X, and wherein: Z is the cyclohexane ring structure; and each X is an ester group, wherein at least one of the X groups is a divalent linkage group attaches the cyclohexane ring structure to another portion of the polyurethane polymer;
a plurality of salt or salt-forming groups; and
a plurality of air-curable ethylenically unsaturated groups.

19. A method of coating a substrate, the method comprising applying an aqueous crosslinkable coating composition of claim 1, and removing the water.

20. A coated substrate preparable by the method of claim 19.

* * * * *

UNITED STATES PATENT AND TRADEMARK OFFICE
CERTIFICATE OF CORRECTION

PATENT NO.        : 8,580,901 B2                                                    Page 1 of 1
APPLICATION NO.   : 12/808403
DATED             : November 12, 2013
INVENTOR(S)       : Killilea et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 627 days.

Signed and Sealed this
Twenty-second Day of September, 2015

Michelle K. Lee
*Director of the United States Patent and Trademark Office*